United States Patent
Zhao et al.

(10) Patent No.: US 10,771,808 B2
(45) Date of Patent: Sep. 8, 2020

(54) VIDEO ENCODER AND DECODER FOR PREDICTIVE PARTITIONING

(71) Applicant: Huawei Technologies Co., Ltd., Shenzhen (CN)

(72) Inventors: Zhijie Zhao, Munich (DE); Max Blaeser, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/533,412

(22) Filed: Aug. 6, 2019

(65) Prior Publication Data

US 2019/0364296 A1    Nov. 28, 2019

Related U.S. Application Data

(63) Continuation of application No. PCT/EP2017/052568, filed on Feb. 6, 2017.

(51) Int. Cl.
  *H04N 19/52* (2014.01)
  *H04N 19/176* (2014.01)
  *H04N 19/567* (2014.01)

(52) U.S. Cl.
  CPC .......... *H04N 19/52* (2014.11); *H04N 19/176* (2014.11); *H04N 19/567* (2014.11)

(58) Field of Classification Search
  CPC ..................................................... H04N 19/52
  (Continued)

(56) References Cited

U.S. PATENT DOCUMENTS

| 2003/0142748 A1 | 7/2003 | Tourapis et al. |
| 2009/0196342 A1 | 8/2009 | Escoda et al. |

(Continued)

FOREIGN PATENT DOCUMENTS

| EP | 2464116 A1 | 6/2012 |
| WO | 2008150113 A1 | 12/2008 |

(Continued)

OTHER PUBLICATIONS

Orchard, "Predictive Motion-Field Segmentation for Image Sequence Coding," IEEE Transactions on Circuits and Systems for Video Technology, XP000334579, pp. 54-70, Institute of Electrical and Electronics Engineers, New York, New York (Feb. 1993).

(Continued)

*Primary Examiner* — Yulin Sun
(74) *Attorney, Agent, or Firm* — Leydig, Voit & Mayer, Ltd.

(57) ABSTRACT

The present disclosure provides a video encoder and a video decoder, which may both be used for partitioning a block in a current picture based on at least one partitioning predictor. The encoder and decoder are configured to select at least one reference picture and a plurality of blocks in the at least one reference picture. Further, to calculate, for each selected block, a projected location in the current picture based on a motion vector associated to the selected block in the reference picture. Then, they are configured to determine each selected block, of which the projected location spatially overlaps with the block in the current picture, to be a reference block, and generate for at least one reference block a partitioning predictor based on partitioning information associated to, for example stored in, the at least one reference picture.

18 Claims, 10 Drawing Sheets

(58) Field of Classification Search
USPC .................................................... 375/240.16
See application file for complete search history.

(56) References Cited

U.S. PATENT DOCUMENTS

| | | |
|---|---|---|
| 2011/0200111 A1 | 8/2011 | Chen et al. |
| 2012/0147961 A1 | 6/2012 | Guo et al. |
| 2012/0263235 A1 | 10/2012 | Sugio et al. |
| 2015/0195573 A1* | 7/2015 | Aflaki Beni ......... H04N 19/513 |
| | | 375/240.16 |

FOREIGN PATENT DOCUMENTS

| | | |
|---|---|---|
| WO | 2012078388 A1 | 6/2012 |
| WO | 2015099823 A1 | 7/2015 |

OTHER PUBLICATIONS

Chen et al., "Object Boundary Based Motion Partition for Video Coding," Picture Coding Symposium, XP030080454, pp. 1-4 (2007).
Blaser et al., "Segmentation-based Partitioning for Motion Compensated Prediction in Video Coding," XP033086850, pp. 1-5, Institute of Electrical and Electronics Engineers, New York, New York (2016).
"Series H: Audiovisual and Multimedia Systems Infrastructure of Audiovisual Services—Coding of Moving Video, Advanced Video Coding for Generic Audiovisual Services," ITU-T H.264, ITU-T Telecommunication Standardization Sector of ITU, pp. 1-804, International Union of Telecommunication, Geneva, Switzerland (Oct. 2016).

\* cited by examiner

VIDEO ENCODER AND DECODER FOR PREDICTIVE PARTITIONING

CROSS-REFERENCE TO RELATED APPLICATIONS

This application is a continuation of International Application No. PCT/EP2017/052568, filed on Feb. 6, 2017, the disclosure of which is hereby incorporated by reference in its entirety.

TECHNICAL FIELD

The present disclosure relates to the field of video processing, specifically to the topic normally referred to as video coding. In particular, the present disclosure presents a video encoder and a video decoder for partitioning a block in a current picture based on at least one partitioning predictor, e.g., for performing predictive block partitioning. The present disclosure also relates to corresponding video encoding and decoding methods.

BACKGROUND

In current video coding schemes, such as H.264/AVC (Advanced Video Coding) and HEVC (High Efficiency Video Coding), motion information in inter-predicted pictures is partitioned into rectangular blocks of configurable size. While in H.264/AVC the motion is partitioned into symmetric blocks with sizes of maximum 16×16 pixels, which are called macroblocks and can be further subdivided down to a minimum of 4×4 pixels, HEVC replaces the macroblock with the coding tree unit (CTU) of maximum size 64×64 pixels. The CTU is not just a larger macroblock, since it can be partitioned using a quad-tree-decomposition scheme into smaller coding units (CU), which can then be subdivided down to a minimum size of 8×8 pixels. Furthermore, unlike in H.264/AVC, asymmetric block partitioning (AMP) of coding units into prediction units (PU) is supported in HEVC.

The block partitioning of HEVC is based purely on rectangular blocks. For arbitrary shaped moving objects, which can be typically expected in natural video sequences, this can lead to a very fine block partitioning along the object boundary. As motion vectors on either side of the boundary can be similar in direction and magnitude, a coding overhead is introduced. That is, additional side-information needs to be transmitted, in order to describe the fine block partitioning and redundant motion vectors.

This problem can be circumvented by applying a different block partitioning strategy. In video coding, the following methods of block partitioning can typically be distinguished: Rectangular block partitioning, Geometric block partitioning, and Object-based block partitioning.

Examples for these different partitioning methods are illustrated in FIG. 9, where a simple scenario of a moving foreground object and a moving background is visualized. The quad-tree-PU partitioning of HEVC, and the related quad-tree-binary-tree partitioning method are representatives of rectangular block partitioning. Geometric partitioning is achieved by splitting the block with a straight line into two segments, also called wedges in this context. Object-based partitioning is the most flexible way of block partitioning, as a block can be partitioned into arbitrary shaped segments.

More flexible block partitioning, however, leads to the following challenges: More side-information may be needed to signal the partitioning structure, in contrast to rectangular block partitioning. Additionally, determining the partitioning at the encoder often comes at a significant increase in complexity.

In the prior art, such as in HEVC, the determination of an optimal partitioning is an encoder task. Typically, a rate-distortion optimization is used to determine the partitioning in an exhaustive search. Further, the rate-distortion optimization is highly specific to a multitude of internal and external conditions, such as encoder implementation, target bitrate, quality, application scenario, etc.

The block partitioning in HEVC is also limited to rectangular partitioning of coding blocks. In detail, this means that a square-shaped coding block can be split into two rectangular prediction blocks, wherein each prediction block is associated with up to two motion vectors. As in AVC, a horizontal and vertical split into two equally sized rectangular blocks is specified. In extension of that, four asymmetric partitionings are specified for further flexibility. In total, eight partitioning modes are therefore specified in HEVC.

A simplified method of a temporal projection of motion is used for the coding of motion vectors. In Merge Mode, a merge candidate list is constructed from spatial and temporal neighboring motion vectors. For the spatial motion vectors, the motion vector field of the current picture is used, the motion vector field containing the motion vectors associated to the blocks of the current picture. Motion vectors sampled at specific positions around the current prediction block are added to the merge candidate list. For the temporal motion vectors, the motion vector field of a reference picture is used. Here, the motion vector field is sampled at two collocated positions, wherein the collocated positions are denoted $C_0$ and $C_1$, as shown in FIG. 10.

Under the assumption that the motion vector fields of the current picture and reference picture are highly correlated, and therefore do not change significantly, it can be expected that a motion predictor can be found at the positions $C_0$ or $C_1$ in the reference picture motion vector field.

SUMMARY

In view of the above-mentioned problems and disadvantages, the present disclosure has the object to improve the prior art of video coding. The present disclosure has a particular aim to provide an encoder and decoder configured to apply a predictive block partitioning method. Thus, the present disclosure desires to improve the coding of block partitioning related side information, and to improve block partitioning methods of specifically geometric partitioning and object-based partitioning, such as segmentation-based-partitioning (SBP).

An object of the present disclosure is achieved by the solution provided in the enclosed independent claims. Advantageous implementations are further defined in the dependent claims.

Specifically, the present disclosure proposes the use of a temporal projection process, which is based on the motion vector field of at least one reference picture, in order to generate partitioning predictors usable for block partitioning in a current picture. The motion vector field of a picture in general contains the motion vectors associated to the blocks of the picture. That is, the motion vector field of the reference picture contains the motion vectors associated to the blocks in the reference picture.

A first aspect of the present disclosure provides a video encoder, the encoder being configured to select at least one reference picture and a plurality of blocks in the at least one reference picture, calculate, for each selected block, a projected location in the current picture based on a motion vector associated to the selected block in the reference picture, determine each selected block, of which the projected location spatially overlaps with the block in the current picture, to be a reference block, and generate for at least one reference block a partitioning predictor based on partitioning information associated to, for example stored in, the at least one reference picture.

According to the first aspect, predictive block partitioning is realized. Specifically, the motion vector field of, for example, an already coded picture can be used to temporally project the partitioning structure according to, for example, an object's motion such that it can be used as a partitioning predictor in the current picture. That is, the partitioning predictor is a prediction of a partitioning structure to be applied to a coding block in the current picture. In other words, the partitioning predictor is an estimation of the optimal partitioning of the current coding block. The projection of partitioning information can be performed for all existing methods of block partitioning, for instance, for rectangular-, geometric- and object-based partitioning.

With the predictive block partitioning, specific advantages are obtained. Firstly, a prediction of the partitioning structure (partitioning predictor) for a current coding block can be generated, e.g. can be directly used by the current block, and may be signaled by a predictor flag or predictor index, in case more than one predictor is available. This can be the case, if several selected blocks are determined to be reference blocks, and a partitioning predictor is calculated for more than one reference block. The partitioning predictor may be further refined using differential coding methods, in cases where it is beneficial according to a rate-distortion criterion. Secondly, the partitioning predictor can be used as a starting point in a rate distortion optimization at the encoder. That is, the encoder can be configured to partition a block in a current picture based on at least one partitioning predictor. Thereby, a fast decision approach may be used, which terminates the rate distortion optimization after a specified number of refinement steps, or if the achieved rate distortion cost falls below a specified threshold. This reduces complexity, and speeds up encoding time.

In a first implementation form of the encoder according to the first aspect, the encoder is configured to calculate, for each selected block, a motion trajectory over time based on the motion vector associated to the selected block in the reference picture and a temporal picture order count, POC, distance between the current picture and the at least one reference picture, and calculate the projected location for each selected block based on the location of the selected block in the reference picture and the motion trajectory.

The motion trajectory can in this way be calculated rather precisely and effectively.

In a second implementation form of the encoder according to the first implementation form of the first aspect, the encoder is configured to calculate the motion trajectory through inversion and scaling of the motion vector associated to the selected block according to a ratio of the POC distance between the current picture and a reference picture and the POC distance between the reference picture and a reference picture associated to the selected block.

This implementation form is a practical realization of predictive block partitioning.

In a third implementation form of the encoder according to the first aspect as such or according to any previous implementation form of the first aspect, the plurality of blocks selected in each reference picture include all blocks of the reference picture, or blocks of the reference picture within a projection range centered around the position of the block in the current picture.

The first alternative yields the highest precision of the predictive block partitioning, but comes at increased computational cost. The second alternative is a reliable and computational cost-efficient solution.

In a fourth implementation form of the encoder according to the first aspect as such or according to any of the previous implementation forms of the first aspect, the encoder is configured to construct and output a list including a plurality of indexed partitioning predictors.

The list with the indexed partitioning predictors is advantageous, since only the index may be signaled, in order to reduce signaling overhead.

In a fifth implementation form of the encoder according to the first aspect as such or according to any previous implementation form of the first aspect, the at least one partitioning predictor includes at least one of: line parameters for geometric partitioning, boundary motion vectors for object-based partitioning, and rectangular partitioning information.

Thus, the predictive block partitioning is compatible with the existing block partitioning methods.

In a sixth implementation form of the encoder according to the fifth implementation form of the first aspect, the line parameters are specified by polar coordinates or by intercept points at the reference block boundaries, and/or the boundary motion vectors specify a partitioning boundary in a reference picture.

In a seventh implementation form of the encoder according to the first aspect as such or according to any previous implementation form of the first aspect, the encoder is configured to generate an initial partitioning for the block in the current picture using the at least one partitioning predictor.

Starting from this initial partitioning, the encoder can then find the optimal partitioning for the block in terms of rate distortion optimization. Thereby, the optimal partitioning of the block in the current picture can be carried out more efficiently and faster.

In an eighth implementation form of the encoder according to the first aspect as such or according to any previous implementation form of the first aspect, the encoder is configured to signal, to a decoder, the at least one partitioning predictor or at least one index pointing to a position of the at least one partitioning predictor in a list of indexed partitioning predictors.

Accordingly, the partitioning predictor can be used at the decoder side. Signaling only the indices reduces the signaling overhead.

In a ninth implementation form of the encoder according to the first aspect as such or according to any of the previous implementation forms of the first aspect, the encoder is configured to signal, to a decoder, difference information between the at least one partitioning predictor and a final partitioning applied to the block in the current picture. Optionally, the encoder may be configured to additionally signal a partition predictor flag and/or partition predictor index.

The final partitioning of a current block is determined normally in terms of rate-distortion optimization. The difference information is information about a difference between the estimated partitioning, e.g. according to the partitioning predictor, and the final (optimal) partitioning of the current block.

The difference information in geometric partitioning is the offset between the line start and end coordinates of the partition line in the current block (adjusted, as shown in FIG. 7) and the line start and end coordinates of the partition line in the block associated to the partitioning predictor (as shown in FIG. 8).

For segmentation based partition, the difference information is the difference between the boundary motion vector in the current block and the boundary motion vector of the block associated to the partitioning predictor.

Signaling only the difference information significantly reduces the signaling overhead, and allows the decoder to obtain a partitioning predictor, and then to directly apply the block partitioning to a block in a current picture based on the partitioning predictor and the difference information.

A second aspect of the present disclosure provides a video decoder, the decoder being configured to obtain a difference information, select at least one reference picture and a plurality of blocks in the at least one reference picture, calculate, for each selected block, a projected location in the current picture based on a motion vector associated to the selected block in the reference picture, determine each selected block, of which the projected location spatially overlaps with the block in the current picture, to be a reference block, generate for at least one reference block a partitioning predictor based on partitioning information associated to, for example stored in, the at least one reference picture, and partition the block in the current picture based on the obtained partitioning predictor and the difference information. Optionally the decoder may be configured to additionally obtain/receive a partition predictor flag and/or partition predictor index.

Accordingly, the advantages of the predictive block partitioning described above with respect to the encoder side, are also obtained for the decoder side. The decoder can use the obtained partitioning predictor and the obtained difference information, for instance obtained from the encoder, in order to find the block partitioning of the block in the current picture.

In a first implementation form of the decoder according to the second aspect, the decoder is configured to calculate, for each selected block, a motion trajectory over time based on the motion vector associated to the selected block in the reference picture and a temporal picture order count, POC, distance between the current picture and the at least one reference picture, and calculate the projected location for each selected block based on the location of the selected block in the reference picture and the motion trajectory.

In a second implementation form of the decoder according to the first implementation form of the second aspect, the decoder is configured to calculate the motion trajectory through inversion and scaling of the motion vector associated to the selected block according to a ratio of the POC distance between the current picture and a reference picture and the POC distance between the reference picture and the reference picture associated to the selected block.

In a third implementation form of the decoder according to the second aspect as such or according to any previous implementation form of the second aspect, the plurality of blocks selected in each reference picture include all blocks of the reference picture, or blocks of the reference picture within a projection range centered around the position of the block in the current picture.

In a fourth implementation form of the decoder according to the second aspect as such or according to any previous implementation form of the second aspect, the at least one partitioning predictor includes at least one of: line parameters for geometric partitioning, boundary motion vectors for object-based partitioning, and rectangular partitioning information.

In a fifth implementation form of the decoder according to the fourth implementation form of the second aspect, the line parameters are specified by polar coordinates or by intercept points at the reference block boundaries, and/or the boundary motion vectors specify a partitioning boundary in a reference picture.

The implementation forms of the decoder achieve the same advantages as described above for the encoder.

A third aspect of the present disclosure provides a video encoding method, the method comprising the steps of selecting at least one reference picture and a plurality of blocks in the at least one reference picture, calculating, for each selected block, a projected location in the current picture based on a motion vector associated to the selected block in the reference picture, determining each selected block, of which the projected location spatially overlaps with the block in the current picture, to be a reference block, and generating for at least one reference block a partitioning predictor based on partitioning information associated to, for example stored in, the at least one reference picture.

In a first implementation form of the video encoding method according to the third aspect, the method further comprises calculating, for each selected block, a motion trajectory over time based on the motion vector associated to the selected block in the reference picture and a temporal picture order count, POC, distance between the current picture and the at least one reference picture, and calculating the projected location for each selected block based on the location of the selected block in the reference picture and the motion trajectory.

In a second implementation form of the video encoding method according to the first implementation form of the third aspect, the method further comprises calculating the motion trajectory through inversion and scaling of the motion vector associated to the selected block according to a ratio of the POC distance between the current picture and a reference picture and the POC distance between the reference picture and a reference picture associated to the selected block.

In a third implementation form of the video encoding method according to the third aspect as such or according to any previous implementation form of the third aspect, the plurality of blocks selected in each reference picture include all blocks of the reference picture, or blocks of the reference picture within a projection range centered around the position of the block in the current picture.

In a fourth implementation form of the video encoding method according to the third aspect as such or according to any of the previous implementation forms of the third aspect, the method further comprises constructing and outputting a list including a plurality of indexed partitioning predictors.

In a fifth implementation form of the video encoding method according to the third aspect as such or according to any previous implementation form of the third aspect, the at least one partitioning predictor includes at least one of: line parameters for geometric partitioning, boundary motion vectors for object-based partitioning, and rectangular partitioning information.

In a sixth implementation form of the video encoding method according to the fifth implementation form of the third aspect, the line parameters are specified by polar coordinates or by intercept points at the reference block boundaries, and/or the boundary motion vectors specify a partitioning boundary in a reference picture.

In a seventh implementation form of the video encoding method according to the third aspect as such or according to any previous implementation form of the third aspect, the method further comprises generating an initial partitioning for the block in the current picture using the at least one partitioning predictor.

In an eighth implementation form of the video encoding method according to the third aspect as such or according to any previous implementation form of the third aspect, the method further comprises signaling, to a decoder, a partition prediction flag, the at least one partitioning predictor or at least one index pointing to a position of the at least one partitioning predictor in a list of indexed partitioning predictors.

In a ninth implementation form of the video encoding method according to the third aspect as such or according to any of the previous implementation forms of the third aspect, the method further comprises signaling, e.g. to a decoder, difference information between the at least one partitioning predictor and a final partitioning applied to the block in the current picture.

The method of the third aspect and its implementation forms achieve the same advantages as described above for the encoder of the first aspect and its implementation forms, respectively.

A fourth aspect of the present disclosure provides a video decoding method, the method comprising the steps of receiving difference information, selecting at least one reference picture and a plurality of blocks in the at least one reference picture, calculating, for each selected block, a projected location in the current picture based on a motion vector associated to the selected block in the reference picture, determining each selected block, of which the projected location spatially overlaps with the block in the current picture, to be a reference block, generating for at least one reference picture a partitioning predictor based on partitioning information associated to, for example stored in, the at least one reference picture, and partitioning the block in the current picture based on the partitioning predictor and the difference information. Optionally the method may comprise obtaining/receiving a partition predictor flag and/or partition predictor index.

In a first implementation form of the video decoding method according to the fourth aspect, the method further comprises calculating, for each selected block, a motion trajectory over time based on the motion vector associated to the selected block in the reference picture and a temporal picture order count, POC, distance between the current picture and the at least one reference picture, and calculating the projected location for each selected block based on the location of the selected block in the reference picture and the motion trajectory.

In a second implementation form of the video decoding method according to the first implementation form of the fourth aspect, the method further comprises calculating the motion trajectory through inversion and scaling of the motion vector according to a ratio of the POC distance between the current picture and a reference picture and the POC distance between the reference picture and a reference picture associated to the selected block.

In a third implementation form of the video decoding method according to the fourth aspect as such or according to any previous implementation form of the fourth aspect, the plurality of blocks selected in each reference picture include all blocks of the reference picture, or blocks of the reference picture within a projection range centered around the position of the block in the current picture.

In a fourth implementation form of the video decoding method according to the fourth aspect as such or according to any previous implementation form of the fourth aspect, the at least one partitioning predictor includes at least one of: line parameters for geometric partitioning, boundary motion vectors for object-based partitioning, and rectangular partitioning information.

In a fifth implementation form of the video decoding method according to the fourth implementation form of the fourth aspect, the line parameters are specified by polar coordinates or by intercept points at the reference block boundaries, and/or the boundary motion vectors specify a partitioning boundary in a reference picture.

The method of the fourth aspect and its implementation forms achieve the same advantages as described above for the decoder of the second aspect and its implementation forms, respectively.

A fifth aspect of the present disclosure provides a computer program product comprising a program code for performing, when running on a computer, the method according to one of the third or fourth aspect.

The computer program product of the fifth aspect accordingly achieves all the advantages of the methods of the third and fourth aspects.

It has to be noted that all devices, elements, units and means described in the present application could be implemented in the software or hardware elements or any kind of combination thereof.

All steps which are performed by the various entities described in the present application as well as the functionalities described to be performed by the various entities are intended to mean that the respective entity is adapted to or configured to perform the respective steps and functionalities.

Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present invention will be explained in the following description of specific embodiments in relation to the enclosed drawings, in which.

DETAILED DESCRIPTION OF THE EMBODIMENTS

Figure 1:
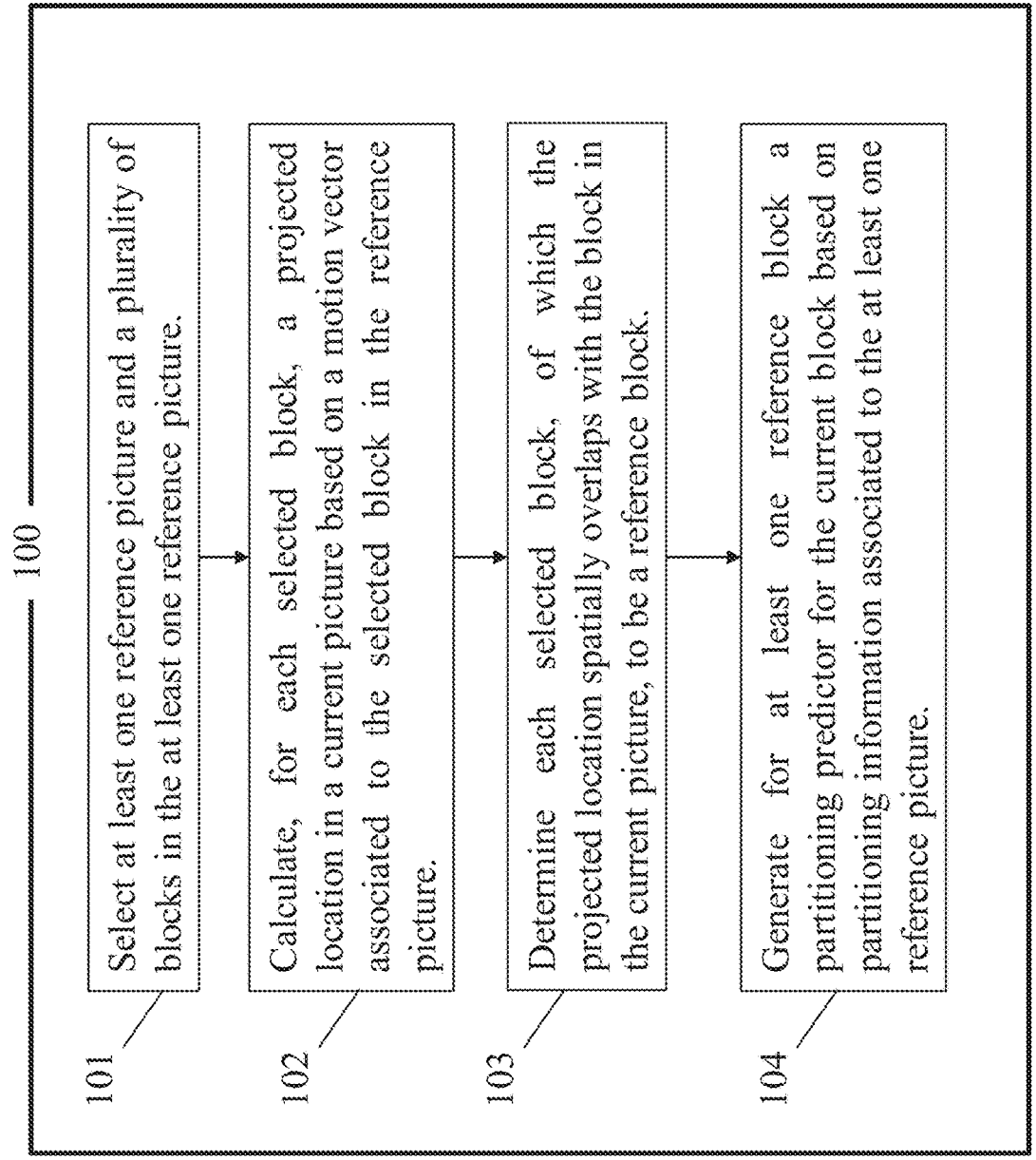
FIG. 1 shows an encoder and an encoding method, respectively, according to embodiments of the present invention.
Figure 3:
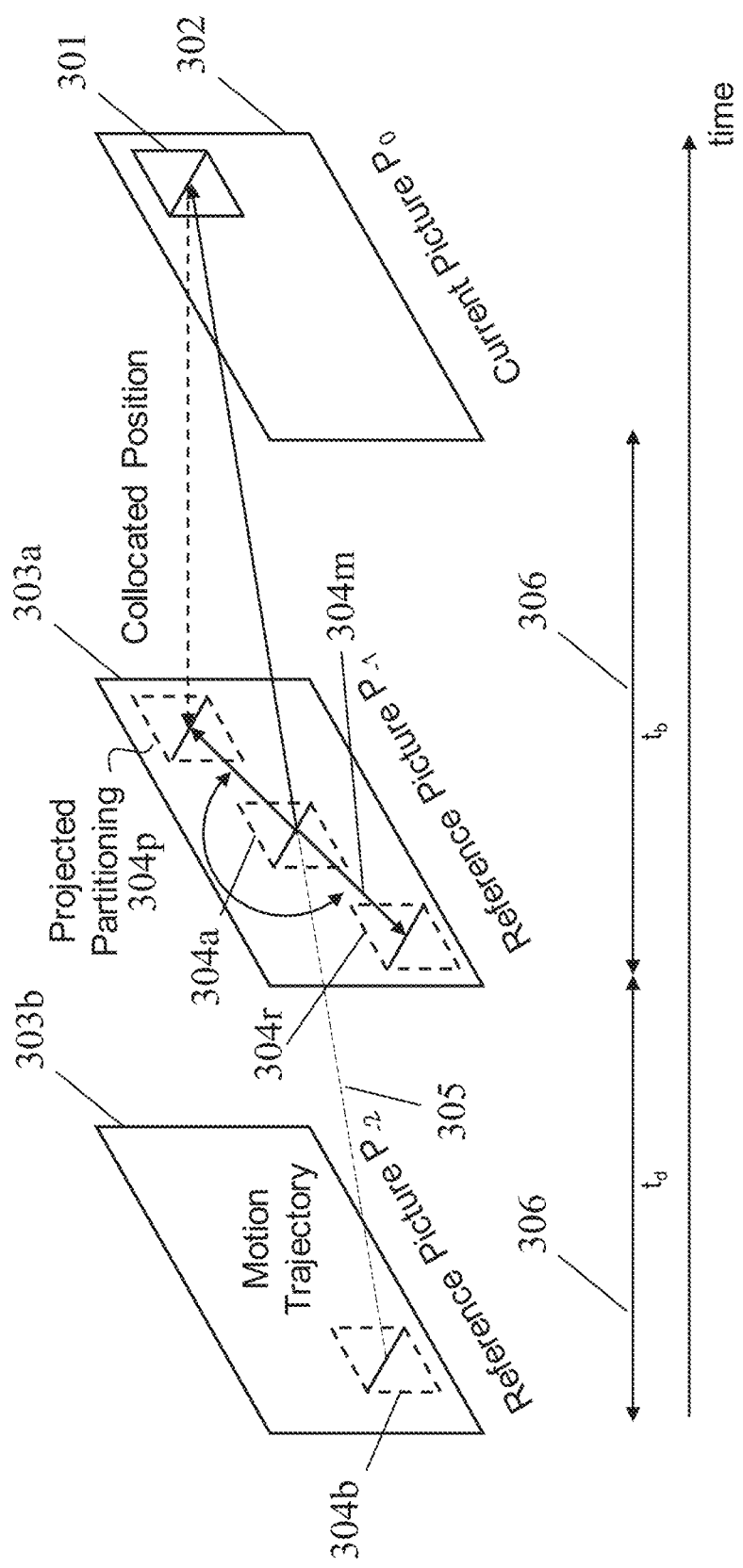
FIG. 3 shows a concept of projecting partitioning information of a reference picture onto a block in a current picture.

FIG. 1 shows a video encoder 100 (and a respective video encoding method) according to an embodiment of the present invention. With reference to FIG. 3, the encoder 100 of FIG. 1 may be suitable for partitioning a block 301 in a current picture 302 based on at least one partitioning predictor, e.g. it may be able to carry out predictive block partitioning. To this end, the encoder 100 is configured to carry out a video encoding method according to an embodiment of the present invention.

In particular, in a first step 101, the encoder 100 is configured to select at least one reference picture 303*a* and a plurality of blocks 304*a* in the at least one reference picture 303*a*. In a second step 102, the encoder 100 is configured to calculate, for each selected block 304*a*, a projected location in the current picture 302 based on a motion vector associated to the selected block 304*a* in the reference picture 303*a*. In a third step 103, the encoder 100 is configured to determine each selected block 304*a*, of which the projected location spatially overlaps with the block 301 in the current picture 302, to be a reference block. In a fourth step 103, the encoder 100 is configured to generate for at least one reference block a partitioning predictor based on partitioning information associated to, for example stored in, the at least one reference picture 303*a*.

Figure 2:
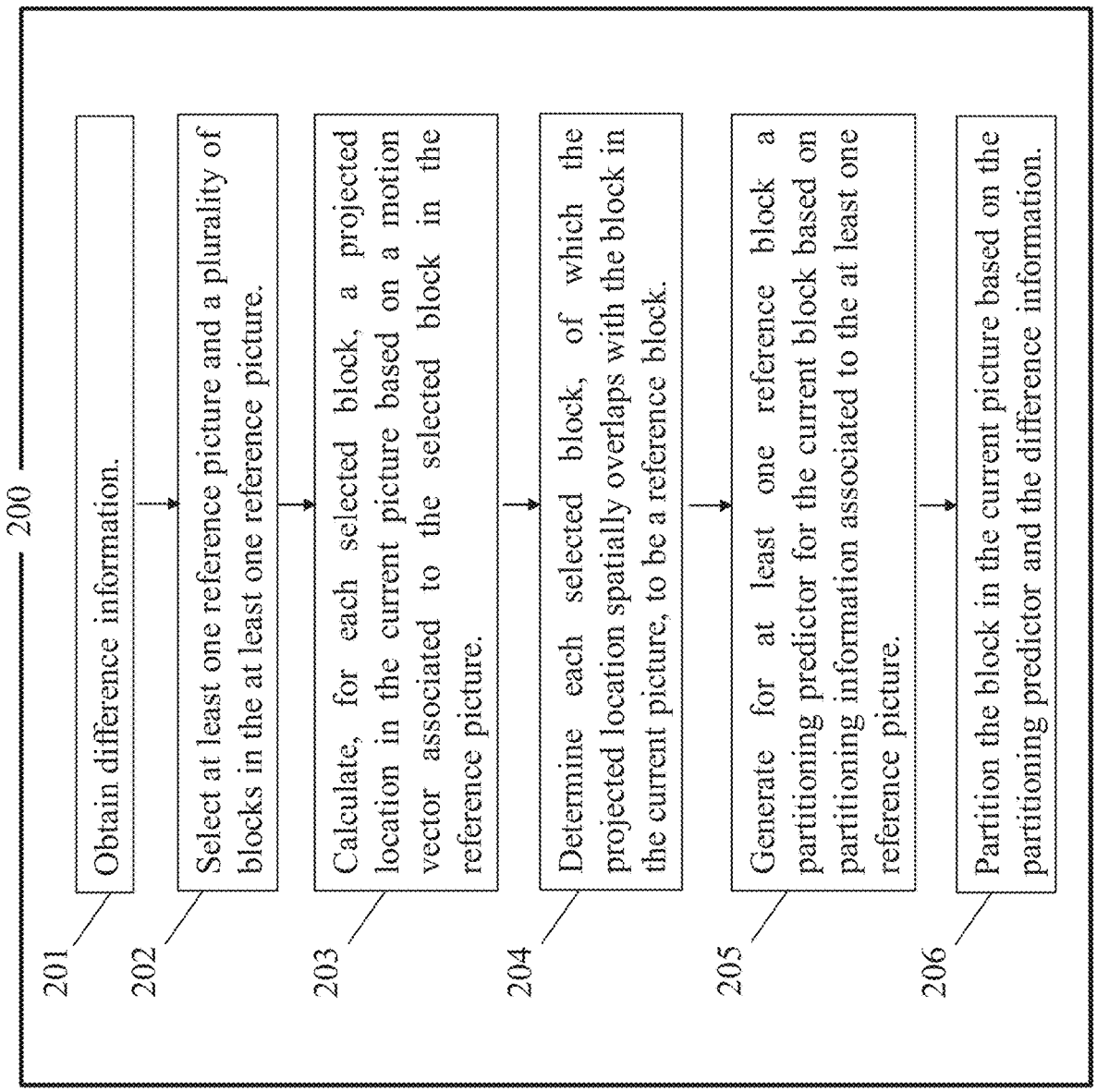
FIG. 2 shows a decoder and a decoding method, respectively, according to embodiments of the present invention.

FIG. 2 shows a video decoder 200 (and a respective decoding method) according to an embodiment of the present invention. With reference again to FIG. 3, the decoder 200 of FIG. 2 may be suitable for decoding the partitioning of a block 301 in a current picture 302 based on at least one partitioning predictor, e.g. it may be able to carry out predictive block partitioning. To this end, the decoder 200 is configured to carry out a video decoding method according to an embodiment of the present invention.

In particular, in a first step 201, the decoder 200 is configured obtain, for example from an encoder 100, difference information. In a second step 202, the decoder 200 is configured to select at least one reference picture 303*a* and a plurality of blocks 304*a* in the at least one reference picture 303*a*. In a third step 203, the decoder 200 is configured to calculate, for each selected block 304*a*, a projected location in the current picture 302 based on a motion vector associated to the selected block 304*a* in the reference picture 303*a*, POC distance (306) between the current picture (302) and a reference picture (303*a*) and the POC distance (306) between the reference picture (303*a*) and a reference picture (303*b*) associated to the selected block (304*a*). In a fourth step 204, the decoder 200 is configured to determine each selected block 304*a*, of which the projected location spatially overlaps with the block 301 in the current picture 302, to be a reference block. In a fifth step 205, the decoder 200 is configured to generate for at least one reference block a partitioning predictor based on partitioning information associated to, for example stored in, the at least one reference picture 303*a*. In a sixth step 206, the decoder 200 is configured to obtain the partition of the block 301, e.g. it is in other words configured to partition the block 301, in the current picture 302 based on the partitioning predictor and the difference information.

An idea of the embodiments according to the present invention, namely the temporal projection, is exemplified in FIG. 3. The partitioning of the current block 301 in the current picture 302 (also referred to as picture $P_0$) is to be estimated. For example, no motion vectors have yet been determined (at the encoder 100) or decoded for the block 301. If, for example, the current block 301 contains a moving object, the object's movement can be tracked over time using at least one available reference picture 303*a*. In particular, a block 304*b* in that reference picture 303*b* of the reference picture 303*a* is the reference block 304*b* of the selected block 304*a* (here, for example, these two pictures 303*a* and 303*b* are referred to as $P_{-1}$, $P_{-2}$; the indices −1 and −2 used for these pictures are exemplary, and pictures from frames other than the first and second previous frames may be used likewise). The movement over time between the selected block 304 in the reference picture 303*a* and the block 304*b* in the reference picture 303*b* associated to the block 304*a* in the reference picture 303*a* leads to a motion trajectory 305.

The motion trajectory 305, under the assumption that the direction and magnitude of the motion do not change significantly for a reasonable time interval, can be modeled by a linear function. If the pictures $P_{-1}$, $P_{-2}$ both precede the current picture 302 in time, the process of linearly modeling the motion trajectory is called forward-projection. That is, the continuation of the motion trajectory 305 from the reference picture 303*a* to the current picture 302 is calculated as a forward-projection. By continuation of the motion trajectory 305 to the current picture 302, a predicted position of a selected reference picture block 304*a* (containing the moving object) in the current picture 302 can be obtained. This bases on the assumption that the block (its content and partitioning structure) stays the same over the time span between the reference picture 303*a* and the current picture 302. If the predicted position spatially overlaps with the position of the block 301 in the current picture 302, an efficient re-usage of partitioning information, which is associated to, for example stored in, the reference picture 303*a* for the selected block 304*a*, is possible. That is, a partitioning predictor, which bases on said associated or stored partitioning information, can be generated. The partitioning predictor can then be used for the coding and partitioning of the current block 301. For the case of bi-prediction, the projection can also be performed using a reference picture 303*a* and a reference picture 303*b* associated to at least one selected block 304*a* in the reference picture 303*a*, which pictures exclusively succeed the current picture 302 in time (e.g. the pictures 303*a* and 303*b* would be referred to as $P_1$, $P_2$ . . . , not shown in FIG. 3, wherein the indices 1 and 2 are again only examples of pictures in subsequent frames), thus allowing a calculation of the continuation of the motion trajectory 305 as a backward-projection.

A practical realization of the above-described idea may process element-wise a motion vector field, e.g. motion vector by motion vector, the motion vectors being contained in the motion vector field, associated to a reference picture 303*a*. In any case, a motion trajectory 305 may be generated through inversion and scaling of the motion vector according to a ratio of a first POC distance 306 between the current picture $P_0$ and the reference picture $P_{-1}$ and a second POC distance 306 between the reference picture $P_{-1}$ and the reference picture $P_{-2}$ associated with the respective motion vector, e.g. associated to a selected block 304a in the reference picture 303a. Forward- and backward projection of motion vectors can thus be handled automatically. Each projected motion vector can be used in a motion compensation-like process, wherein instead of pixel values, partitioning information is compensated.

Figure 4:
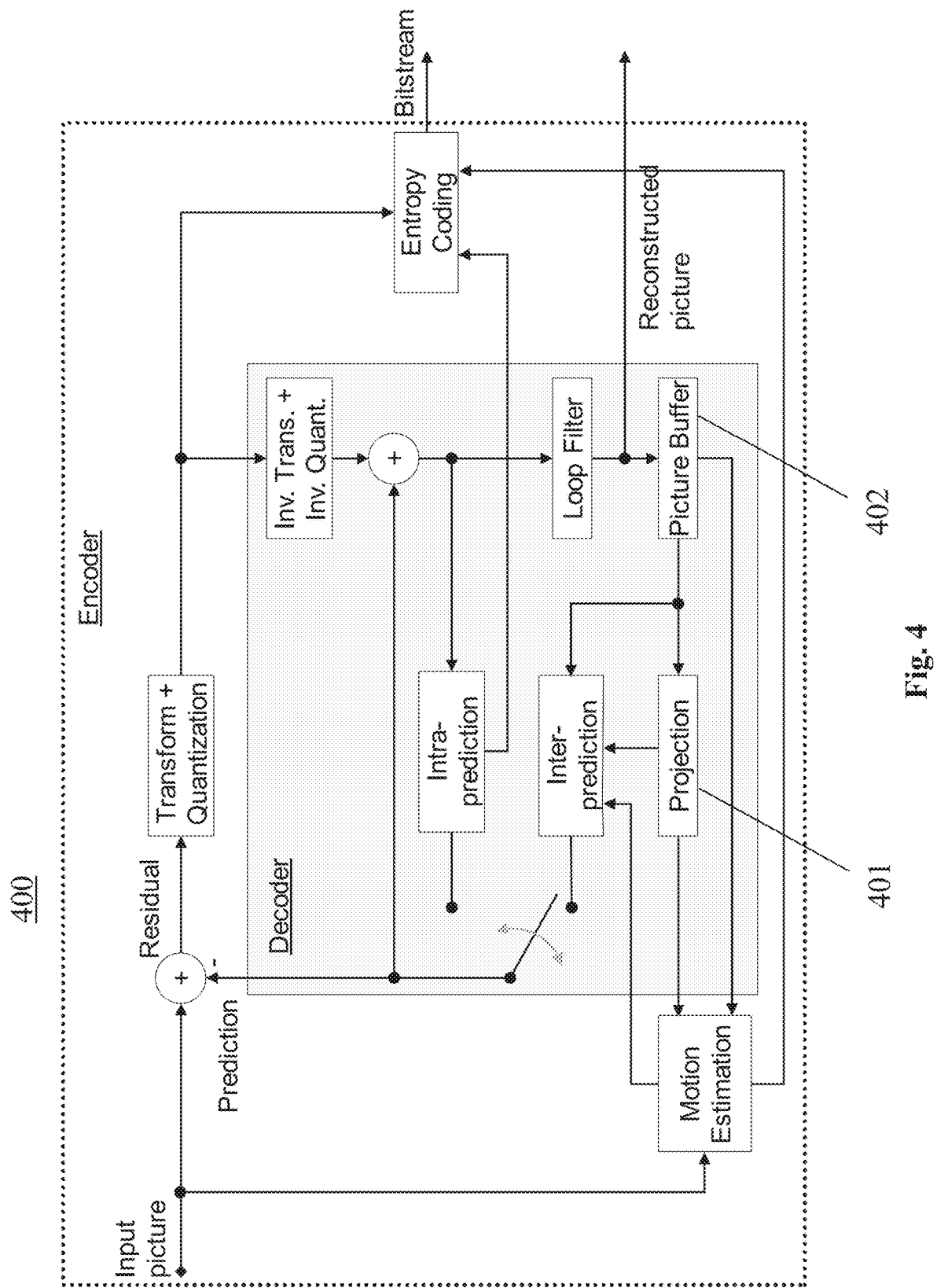
FIG. 4 shows a simplified hybrid encoder/decoder (decoder grey shaded) model according to an embodiment of the present invention.

FIG. 4 shows a simplified structure of a hybrid encoder/decoder 400 (wherein the decoder part is grey shaded) according to an embodiment of the present invention. The hybrid encoder/decoder 400 can perform the functions of the encoder 100 and the decoder 200 shown in the FIGS. 1 and 2, respectively. FIG. 4 specifically shows the location of a projection sub-unit 401 in such a hybrid video encoder/decoder 400. The sub-unit 401 performs the tasks of generating projected motion vectors, e.g. the task of calculating the motion trajectory 305 based on the motion vector of a selected block 304a, and of finding the projected location of said selected block 304a in the current picture 302. Then the sub-unit 401 applies the partitioning information associated to the selected block 304a in the at least one reference picture 303a to the current block 301 in a motion-compensation-like process. That is, the information of how the selected block 304a was partitioned when the reference picture 303a was coded can be re-used. As an example, the current block 301 could be partitioned exactly like the selected block 304a. Typically, however, the partitioning predictor associated to the selected block 304a is used only as a starting point (initial partitioning) for obtaining the optimal partitioning of the current block 301.

An input into the sub-unit 401 is at least one reference picture 303a, which may be stored in a picture buffer 402. The reference picture 303a contains all information necessary for the projection process, including at least the motion vector field and partitioning information.

Figure 5:
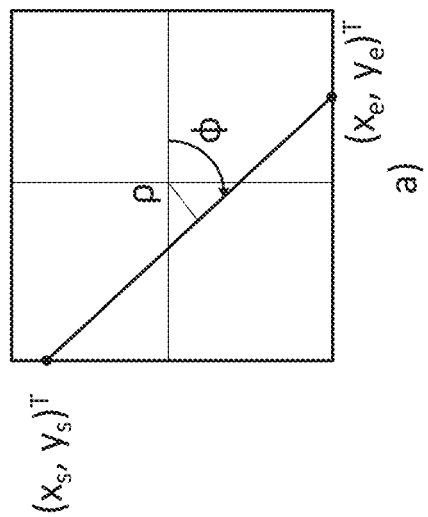
FIG. 5 shows examples of block partitioning information for the case of a) geometric partitioning and b) object-based partitioning using a motion vector.
Figure 5:
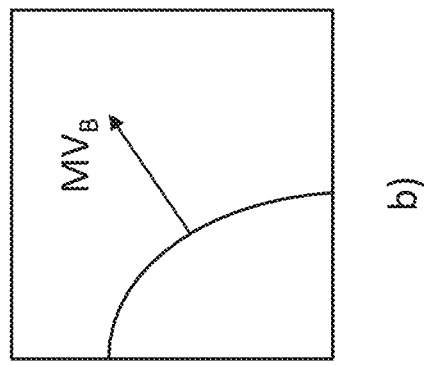

The partitioning information can, for example, include with reference to FIG. 5: Line parameters for geometric partitioning 501, e.g. block boundary intercept coordinates $(x_s, y_s)^T$, $(x_e, y_e)^T$ (wherein index s means 'starting point' and index e means 'end point', as shown in FIG. 5a) or polar coordinates $(\rho, \varphi)$, as shown in FIG. 5a. Alternatively, a motion vector for the case of object-based partitioning 502, specifically for the case of segmentation-based partitioning, wherein the partitioning boundary is generated by segmenting a reference picture region indicated by a boundary motion vector $MV_B$ (wherein index B means 'boundary'), as shown in FIG. 5b. Alternatively, potentially any other method of partitioning a block, wherein the partition line or boundary can be parametrized.

In practical encoder/decoder realizations, such partitioning information is typically stored in the form of memory fields, similar to the motion vector field, wherein each element of the field addresses a pixel sub block. The size of the sub block is typically specified by the smallest independently addressable block of pixels.

Figure 6:
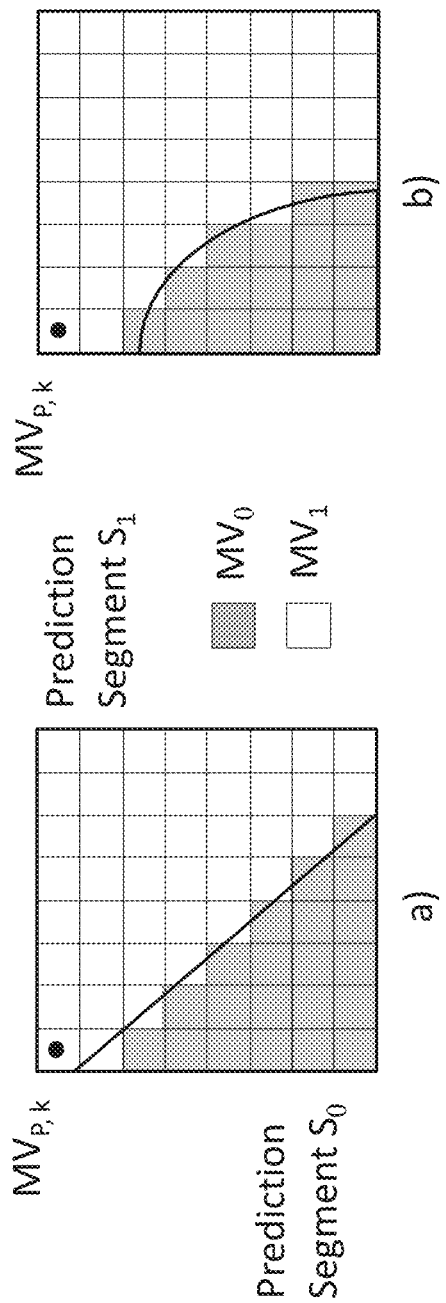
FIG. 6 shows an example of motion vector storage on a 4×4 pixel grid for a block of a size of 32×32 pixels in case of a) geometric partitioning and b) object-based partitioning.

Motion vectors are typically stored on a block-by-block basis using a regular grid, wherein each motion vector represents the translational motion of a block of pixels. The size of each block of pixels is an encoder-specific setting, and controls the motion vector field resolution. In the following, if not otherwise stated, a fixed block size of 4×4 pixels is assumed for simplicity. All motion vectors, which are associated to subparts of a prediction block, as in rectangular motion partitioning, or to different prediction segments, as in geometric partitioning or segmentation-based partitioning, may share the same motion vector. This is exemplified in FIG. 6 for both cases.

FIG. 6a shows an exemplary motion vector storage on a 4×4 pixel grid for a block size of 32×32 pixels in the case of geometric partitioning. In FIG. 6a the prediction block is divided into two prediction segments $S_0$ and $S_1$. The 4×4 pixel blocks in $S_0$ (grey shaded area) are each associated to the motion vector $MV_0$, e.g. they share this motion vector, whereas the 4×4 pixel blocks in $S_1$ (white area) are each associated to the motion vector $MV_1$. FIG. 6b shows the same situation for object-based partitioning. That is, the different partitions are distinguished in a binary manner by the two motion vectors.

One motion vector $MV_{P, k}$ may point to a position in a reference picture $P_i$, while another motion vector points to another reference picture $P_j$. Because thus motion vectors of the same motion vector field can point to different reference pictures 303a, a respective reference picture index is preferably stored similarly on a 4×4 grid as part of the motion vector field. The temporal POC distance 306 between a reference picture $P_i$ and another reference picture $P_j$ is denoted $t_d$.

In the following, the motion vector field of a selected reference picture $P_i$ 303a shall be denoted $MVF_P(x, y)$, the index P meaning 'picture', and the partitioning information of the reference picture $I_P(x, y)$. A single element, e.g. a single motion vector, of the motion vector field $MVF_P$ at a position $(x_k, y_k)^T$ shall be denoted as motion vector $MV_{P, k}$, and similarly the partitioning information at $(x_k, y_k)^T$ shall be denoted as $I_{P, k}$. The motion vector $MV_{P, k}$ is associated to a selected block 304a in the reference picture 303a. The location of the current block 301 in the current picture 302 is known as $(x_c, y_c)^T$.

A projection and compensation process can be performed at the encoder 100 and decoder 200 side, respectively, with an exemplified implementation consisting of the following steps:

1. For a coding block 301 at the position $(x_c, y_c)^T$ and of a given size S (e.g. in luma or chroma samples), which is part of the current picture $P_0$, a reference picture $P_i$ is selected, for example, from the reference picture buffer 401. The temporal POC distance 306 between the pictures $P_0$ and $P_i$ is determined and denoted $t_b$.

2. The motion vector field of reference picture $P_i$, which includes the motion vectors $MV_{P, k}$ of the reference picture 303a, is accessed, wherein the index k represents the address of the motion vector within the motion vector field at the position $(x_k, y_k)^T$. For the following projection process, either a projection range centered around a collocated position (e.g. a 3×3 CTU window) may be specified, e.g. a projection range in the reference picture 303a centered around the position the block 301 has in the current picture 302, or the entire motion vector field of the reference picture 303a may be processed. The projection process may be performed in a raster-scan order or may start at the center of selected block 304a and access motion vectors spiraling outwards until all elements within the projection range have been processed.

3. For each motion vector $MV_{P, k}$ at position $(x_k, y_k)^T$ within the projection range, a projected motion vector $MV_{TP, k}$) is calculated by:

$$MV_{TP,k} = -\frac{t_b}{t_d} \cdot MV_{P,k}$$

wherein $t_d$ denotes the temporal POC distance 306 between the current reference picture 303a ($P_i$) and a reference picture 303b, which is associated to the selected block 304a, e.g. is referred to by the motion vector. That is, for the selected block 304a, the motion trajectory 305 is calculated based on the motion vector of the selected block 304a, and the temporal POC distance 306 between the current picture 302 and the reference picture 303a.

4. A projected location $(x_p, y_p)^T$ is then determined by adding the projected motion vector (motion trajectory 305) to the current location:

$$\begin{pmatrix} x_p \\ y_p \end{pmatrix} = \begin{pmatrix} x_k \\ y_k \end{pmatrix} + MV_{TP,k}$$

That is, the projected location of the selected block 304a is calculated based on the current location of the selected block 304a in the reference picture 303a and the motion trajectory 305.

Figure 7:
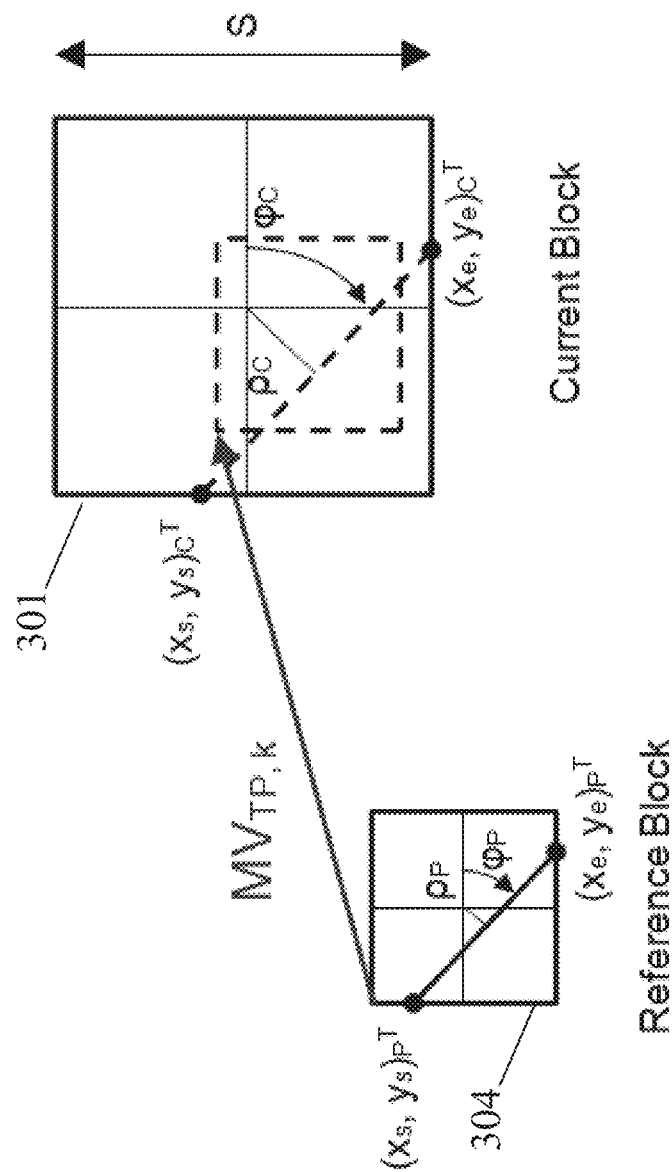
FIG. 7 shows an adjustment of reference block partitioning information for geometric partitioning.

5. If the projected location $(x_p, y_p)^T$ lies within the boundaries of the current coding block 301 at position $(x_c, y_c)^T$, e.g. if the projected location of the selected block 304a spatially overlaps with the block 301 in the current picture 302, the selected block 304a is a reference block, e.g. a partitioning predictor candidate is found:

$(x_c \leq x_p \leq x_c + S \cap y_c \leq y_p \leq y_c + S) \rightarrow$ Predictor candidate 6. The partitioning information $I_{P,k}$ stored at position $(x_k, y_k)^T$ is added to the partitioning predictor candidate list of the current block 301.

i. In the case of geometric partitioning, the projected line parameters of the reference block $(x_s, y_s)_P^T$, $(x_e, y_e)_P^T$ or $(\rho_P, \varphi_P)$ may need to be adjusted according to the current block center position in relation to the reference block position. This is illustrated in FIG. 7 and explained in the following.

If line intercept points are specified, new intercept points $(x_s, y_s)_C^T$, $(x_e, y_e)_C^T$ can be easily computed from the motion compensated intercept points $(x_s, y_s)_P^T + MV_{TP,k}$ and $(x_e, y_e)_P^T + MV_{TP,k}$ via $$\begin{pmatrix} x_{s,o} \\ y_{s,o} \end{pmatrix} = \begin{pmatrix} x_{s,p} \\ y_{s,p} \end{pmatrix} + MV_{TP,k},$$

$$\begin{pmatrix} x_{e,o} \\ y_{e,o} \end{pmatrix} = \begin{pmatrix} x_{e,p} \\ y_{e,p} \end{pmatrix} + MV_{TP,k}$$

$$\begin{pmatrix} x_{s,c} \\ y_{s,c} \end{pmatrix} = \begin{pmatrix} \frac{(x_{s,o}y_{e,o} - y_{s,o}x_{e,o})(x_{s,b} - x_{e,b}) - (x_{s,o} - x_{e,o})(x_{s,b}y_{e,b} - y_{s,b}x_{e,b})}{(x_{s,o} - x_{e,o})(y_{s,b} - y_{e,b}) - (y_{s,o} - y_{e,o})(x_{s,b} - x_{e,b})} \\ \frac{(x_{s,o}y_{e,o} - y_{s,o}x_{e,o})(y_{s,b} - y_{e,b}) - (y_{s,o} - y_{e,o})(x_{s,b}y_{e,b} - y_{s,b}x_{e,b})}{(x_{s,o} - x_{e,o})(y_{s,b} - y_{e,b}) - (y_{s,o} - y_{e,o})(x_{s,b} - x_{e,b})} \end{pmatrix}$$

wherein $(x_s, y_s)_B^T$, $(x_e, y_e)_B^T$ represent the line start and end coordinates of the four block boundaries of the current block. $(x_{s,o}, y_{s,o})$ and $(x_{e,o}, y_{e,o})$ may be further used to represent the intermediate calculation results.

For the polar coordinate representation, this results in a shift of the coordinates system by an offset vector:

$$\begin{pmatrix} x_o \\ y_o \end{pmatrix} = \begin{pmatrix} x_c \\ y_c \end{pmatrix} - \begin{pmatrix} x_k \\ y_k \end{pmatrix} - MV_{TP,k}$$

-continued $$\rho_c = \sqrt{(x_k + x_o)^2 + (y_k + y_o)^2}$$

$$\varphi_c = \varphi_P$$

ii. In the case of object based partitioning using a boundary motion vector, no such adjustment is needed. The partitioning information $I_{P,k}$ at the reference position, which consists of a boundary motion vector $MV_B$ (wherein index B means 'boundary') can be used after appropriate motion vector scaling according to the POC distances 306, which are associated with $MV_B$.

7. The above-described projection process may be repeated until a specified maximum number of partitioning predictors have been found, or is terminated if all motion vectors $MV_{P,k}$ of the current reference picture 303a ($P_i$) have been processed. Thus, a candidate list of projected partitioning information may be constructed. For signaling purposes, the chosen partitioning can be signaled by an index, which points to the position of the partitioning predictor candidate list.

In conclusion, an output of the projection sub-unit 401 is this candidate list, which can also be referred to as a list of partitioning predictors. Partitioning predictors may include geometric partitioning line parameters, boundary motion vectors for object based partitioning or rectangular partitioning. The partitioning predictors can be used in the following subsequent stages.

For instance, at the encoder 100 side, segment-based motion estimation may be performed. In a practical implementation, the partitioning predictor may be used to generate an initial partitioning, which is further refined by a rate-distortion estimation.

At the encoder side, the projected partitioning information (line parameters for geometric partition, boundary motion vector for segmentation based partition, the quad tree and binary tree partition for rectangular partition) can be used as a starting point for partitioning of the current block 301 in the rate distortion optimization process. A fast decision approach can be used, which terminates the partitioning in the rate distortion optimization process after a specified number of refinement steps or if the achieved rate distortion cost falls below a specified threshold. For line parameters with line start and end coordinates in geometric partitioning, a small range of offsets around the projected line start and end coordinates could be defined to perform the block partition. Because only a limited number of offsets around the projected line start and end coordinates need to be tested, the search range is reduced in this case. One best partition could be selected in terms of rate-distortion optimization. In this way, the number of the tested partition lines is dramatically reduced. Therefore, this approach can reduce the encoder complexity and reduce the encoding time.

At the decoder 200 side, for instance, segment-wise motion compensation can be performed by applying decoded segment motion vectors to the segments generated by the decoded partitioning information.

Figure 8:
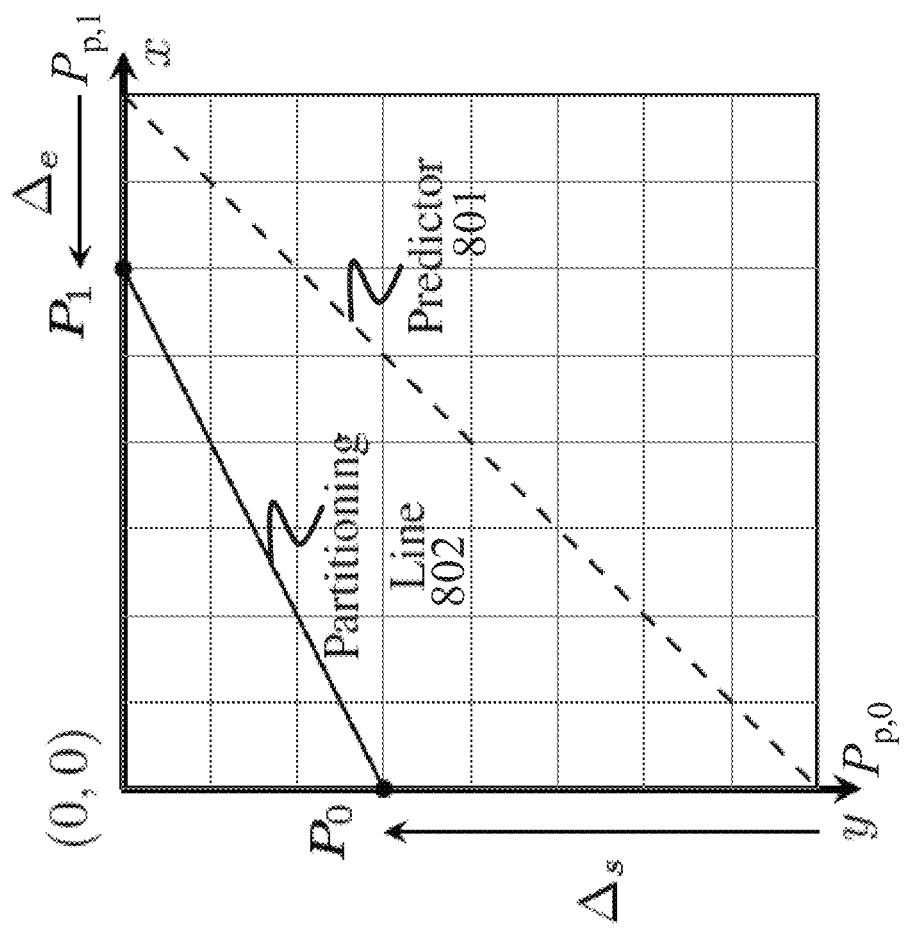
FIG. 8 shows the difference information (offset in the line start and end coordinates) for geometric partitioning with two intercept points
Figure 9:
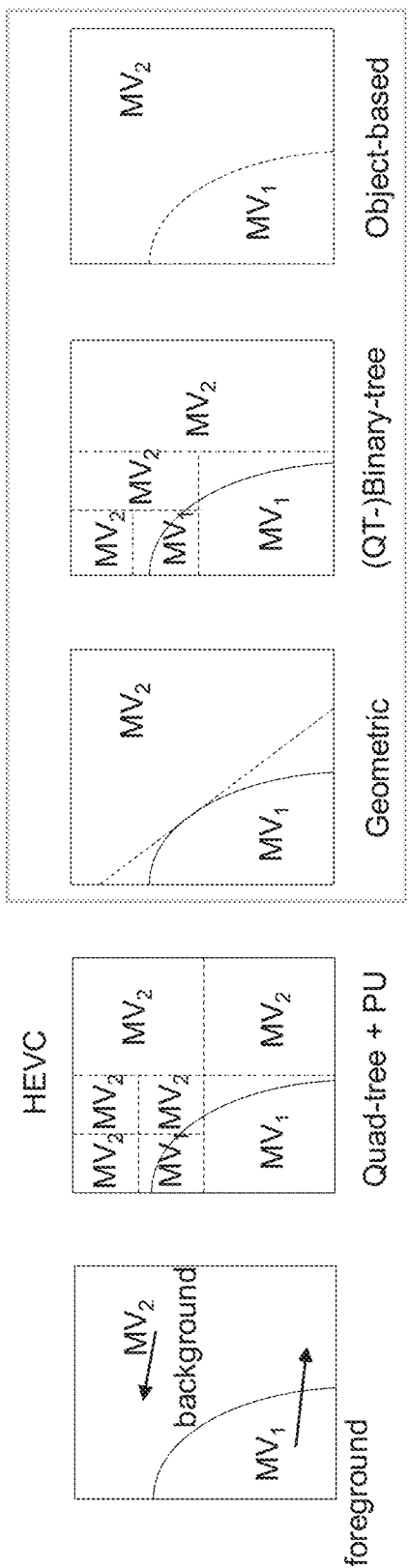
FIG. 9 shows examples for different conventional motion partitioning methods in video coding.
Figure 10:
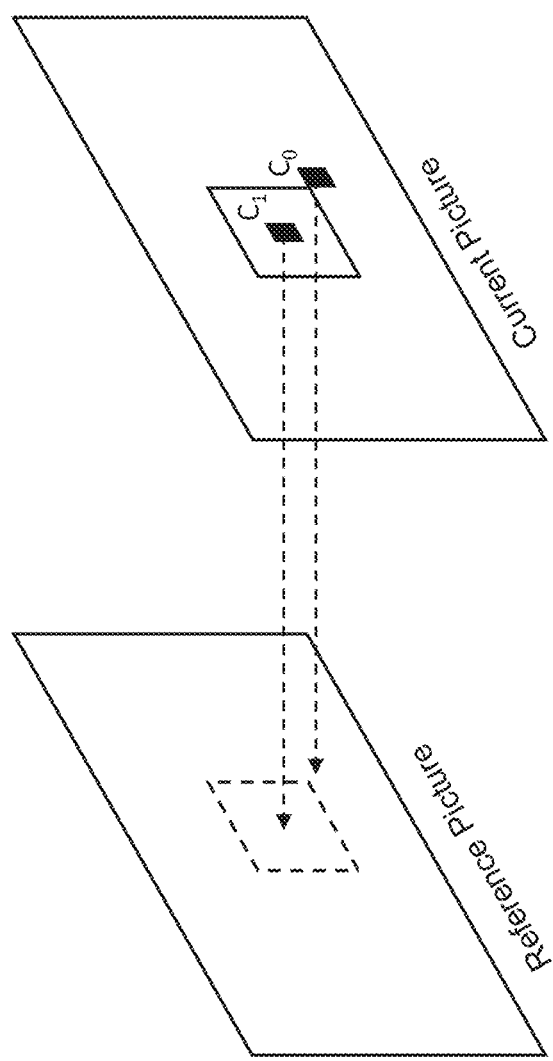
FIG. 10 shows temporally collocated motion vectors in HEVC.

FIG. 8 shows the difference information for geometric partitioning using two offset values of the coordinates of intercept points. The partition line in geometric partitioning in FIG. 8 is described by using two points $P_0=[x_0, y_0]^T$ and $P_1=[x_1, y_1]^T$ located on the boundary of a given block. The two points form a straight line.

$$(y-y_0)(x_1-x_0)=(y_1-y_0)(x-x_0)$$

As direct coding of the two points $P_0$ and $P_1$ would consume too much bit rate, the temporal/spatial prediction of the partitioning line is used. Specifically for temporal prediction of the partitioning line, if the coordinates of the two intercept points of the partitioning line of the predictor are $P_{p,0}=[x_{p,0}, y_{p,0}]^T$ and $P_{p,1}=[x_{p,1}, y_{p,1}]^T$, the difference information is $(\Delta_s, \Delta_e)$ as shown in FIG. 8, where $$\Delta_s=(x_0-x_{p,0},y_0-y_{p,0})$$

$$\Delta_e=(x_1-x_{p,1},y_1-y_{p,1})$$

A negative valued offset moves a point in mathematically positive sense along the block boundary and vice versa. Signaling only the difference information significantly reduces the signaling overhead of the two intercept points.

In other words, FIG. 8 shows an example for a partitioning 801 generated based on a partitioning predictor (e.g. an initial partitioning) and another partitioning 802. The partitioning 801 may be an initial partitioning based on the partitioning predictor. The other partitioning may be any other partitioning derived by other rules, by testing all possible or a given subset of fixed partitionings or a partitioning obtained by modifying the partitioning 801 based on given rules. Embodiments may be configured to evaluate different partitioning candidates (comprising the partitioning 801 and any other partitionings 802) and select only one partitioning as final partitioning. The evaluation and selection of the final partitioning may be performed, e.g. by comparing the rate distortions of the different partitionings and selecting the one with the minimum rate distortion, or by selecting the first partitioning which provides a rate distortion below a predetermined threshold.

Referring to the above descriptions of the various embodiments, embodiments of the video encoder and video decoder, may be configured to select at least one reference picture 303a (in FIG. 3 only one exemplary reference picture is shown) and a plurality of blocks 304a (in FIG. 3 only one exemplary block is shown) in the at least one reference picture 303a, e.g. for a current block (e.g. a block currently to be encoded or decoded, the index 0 indicating a current time instance). The embodiments may be configured to select a preceding, e.g. a directly preceding ($P_{-1}$) or any other preceding picture (e.g. $P_{-2}$, $P_{-3}$, etc., negative indices indicating preceding time instances), and/or a subsequent, e.g. a directly subsequent ($P_1$) or any other subsequent picture (e.g. $P_2$, $P_3$, etc., positive indices indicating subsequent time instances).

Embodiments of the video encoder and video decoder, may be further configured to calculate, for each selected block 304a of the plurality of selected blocks, a projected location in a current picture 302 based on a motion vector associated to the selected block (304a) in the reference picture (303a). Reference sign 304m shows the motion vector of the reference block 304a, e.g. the displacement or motion of the reference block 304a in the reference picture 303a with regard to the reference block 304b in the respective picture 303b, the reference block 304b being or having been used for predicting and/or reconstructing the reference block 304a in the reference picture 303a. Therefore, reference block 304b and reference picture 303b may also be referred to as reference block 304b of the reference block 304a and reference image 303b of the reference block 303a. When encoding (or decoding) the current block 301, the reference block 304a and at least also partially the reference picture 303a have been previously reconstructed and for example stored in the picture buffer 402 (see FIG. 4). Accordingly also the motion vector 304m has been decoded or reconstructed and is for example also stored in the picture buffer 402. Thus, all information required for projecting the position of the reference block 304a according to its past motion (represented by motion vector 304m) to a corresponding position (see reference sign 304p) to a position in the current picture 302, is available, e.g. in the picture buffer 402. Reference sign 304p shows the projected or predicted location of the reference block 304a in the reference picture 303a, and reference sign 304r shows the respective location of the reference block 304b of the reference block 304a in the reference picture 303a.

In an ideal case (ideal with regard to prediction), the projected position 304p of the reference block 304a in the reference image 303a is the same as the position of the current block 301 in the current picture 302. In scenarios or use cases, where the time difference (e.g. by actual time or by picture counts) between the current image 302 and the reference image 303a on one hand and the time difference between the reference image 303a and the reference image 303b of the reference block 304a on the other hand is the same, embodiments may directly use the motion vector for prediction by just inverting the motion vector 304m as shown in FIG. 3 (see arrow indicating a 180° inversion). In other cases, embodiments may be configured to apply a scaling to improve the prediction or projection as described above.

Embodiments of the video encoder and video decoder, may be further configured to determine each selected block 304a, of which the projected location 304p spatially overlaps with the block 301 in the current picture 302, to be a reference block. In other words, embodiments of the video encoder and video decoder may be configured to select a selected block 304a as reference block if the projected location 304p spatially overlaps with the block 301 in the current picture 302. Embodiments may be configured to select all selected blocks 304a which projected location 304p spatially overlap with the current block 301 as reference blocks, or only some or only one depending on predetermined or adaptive rules, e.g. a fast mode limiting the number of reference blocks to a specific number, or an overlap mode which requires that the projected block at projection location 304p overlaps by a certain minimum percentage (not just any overlap) of the blocks areas or by a certain number of pixels.

Embodiments of the video encoder and video decoder, may be further configured to generate for at least one reference block a partitioning predictor for the current block 301 based on partitioning information associated to the at least one reference picture 303a, and in particular based on partitioning information associated to the reference block 304a. In other words, embodiments of the video encoder and video decoder may be configured to generate a partitioning predictor for only one reference block or for some or all reference blocks, e.g. for each reference block one partitioning predictor. The decision on the number of reference blocks to be selected may be, e.g., based on a fast mode or an overlap mode or other modes as exemplarily described above.

Embodiments of the video encoder may be further configured to partition the block 301 in the current picture 302 based on the partitioning predictor and optionally derive additionally a difference information, wherein the difference information comprises or indicates a difference between the partitioning information of the partitioning predictor (e.g. 801) and a partitioning information of a final partitioning (e.g. 802) to improve the partitioning. The difference information may also be referred to as partitioning difference information. Embodiments of the video encoder may be configured to send the difference information or the partitioning predictor and the difference information.

Embodiments of the video decoder, may be further configured to partition the block 301 in the current picture 302 based on the partitioning predictor and optionally additionally based on a difference information, wherein the difference information comprises or indicates a difference between the partitioning information of the partitioning predictor (e.g. 801) and a partitioning information of a final partitioning (e.g. 802) to improve the partitioning. The difference information may also be referred to as partitioning difference information and may also be zero in case the partitioning information of the partitioning predictor has been selected as the final partitioning. Embodiments of the video decoder may be configured to receive the difference information, or the partitioning predictor and the difference information.

Embodiments of the video encoder and video decoder, may be further configured to send or receive a partition prediction flag to indicate that the partition prediction is used or enabled/disabled, and a partition predictor index, e.g. in case more than one partitioning predictor is available.

Embodiments of the invention may be performed by hardware, software or any combination thereof. Embodiments of the video encoder and video decoder may comprise processors, and embodiments of the video encoding and decoding methods may be performed by processors.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A video encoder, the video encoder being configured to:
select at least one reference picture and a plurality of blocks in the at least one reference picture;
calculate, for each selected block, a projected location in a current picture based on a motion vector associated to the selected block in the reference picture;
determine each selected block, of which the projected location spatially overlaps with the block in the current picture, to be a reference block; and
generate for at least one reference block a partitioning predictor for the current block based on partitioning information associated to the at least one reference picture.

2. The video encoder according claim 1, being configured to:
calculate, for each selected block, a motion trajectory over time based on the motion vector associated to the selected block in the reference picture and a temporal picture order count, POC, distance between the current picture and the at least one reference picture; and
calculate the projected location for each selected block based on the location of the selected block in the reference picture and the motion trajectory.

3. The video encoder according to claim 2, being configured to:
calculate the motion trajectory through inversion and scaling of the motion vector associated to the selected block according to a ratio of the POC distance between the current picture and the reference picture and the POC distance between the reference picture and a reference picture associated to the selected block.

4. The video encoder according to claim 1, wherein the plurality of blocks selected in each reference picture include:
all blocks of the reference picture, or
blocks of the reference picture within a projection range centered around the position of the block in the current picture.

5. The video encoder according to claim 1, being configured to:
construct and output a list including a plurality of indexed partitioning predictors.

6. The video encoder according to claim 1, wherein the at least one partitioning predictor includes at least one of: line parameters for geometric partitioning, boundary motion vectors for object-based partitioning, and rectangular partitioning information.

7. The video encoder according to claim 6, wherein
the line parameters are specified by polar coordinates or by intercept points at the reference block boundaries, and/or
the boundary motion vectors specify a partitioning boundary in a reference picture.

8. The video encoder according to claim 1, being configured to:
generate an initial partitioning for the block in the current picture using the at least one partitioning predictor.

9. The video encoder according to claim 1, being configured to:
signal, to a decoder, the at least one partitioning predictor or at least one index pointing to a position of the at least one partitioning predictor in a list of indexed partitioning predictors.

10. The video encoder according to claim 1, the encoder being configured to:
signal, to a decoder, difference information between the at least one partitioning predictor and a final partitioning applied to the block in the current picture.

11. A video decoder, the video decoder being configured to:
obtain difference information;
select at least one reference picture and a plurality of blocks in the at least one reference picture;
calculate, for each selected block, a projected location in a current picture based on a motion vector associated to the selected block in the reference picture;
determine each selected block, of which the projected location spatially overlaps with the block in the current picture, to be a reference block;

generate for at least one reference block a partitioning predictor for the current block based on partitioning information associated to the at least one reference picture; and partition the block in the current picture based on the partitioning predictor and the difference information.

12. The video decoder according to claim 11, being configured to:

calculate, for each selected block, a motion trajectory over time based on the motion vector associated to the selected block in the reference picture and a temporal picture order count, POC, distance between the current picture and the at least one reference picture, and calculate the projected location for each selected block based on the location of the selected block in the reference picture and the motion trajectory.

13. The video decoder according to claim 12, being configured to:

calculate the motion trajectory through inversion and scaling of the motion vector associated to the selected block according to a ratio of the POC distance between the current picture and the reference picture and the POC distance between the reference picture and a reference picture associated to the selected block.

14. The video decoder according to claim 11, wherein the plurality of blocks selected in each reference picture include:

all blocks of the reference picture, or blocks of the reference picture within a projection range centered around the position of the block in the current picture.

15. The video decoder according to claim 11, wherein the at least one partitioning predictor includes at least one of: line parameters for geometric partitioning, boundary motion vectors for object-based partitioning, and rectangular partitioning information.

16. The video decoder according to claim 15, wherein the line parameters are specified by polar coordinates or by intercept points at the reference block boundaries, and/or the boundary motion vectors specify a partitioning boundary in a reference picture.

17. A video encoding method, the method comprising the steps of:

selecting at least one reference picture and a plurality of blocks in the at least one reference picture;

calculating, for each selected block, a projected location in a current picture based on a motion vector associated to the selected block;

determining each selected block, of which the projected location spatially overlaps with the block in the current picture, to be a reference block; and generating for at least one reference block a partitioning predictor for the current block based on partitioning information associated to the at least one reference picture.

18. A video decoding method, the method comprising the steps of:

receiving difference information;

selecting at least one reference picture and a plurality of blocks in the at least one reference picture;

calculating, for each selected block, a projected location in a current picture based on a motion vector associated to the selected block;

determining each selected block, of which the projected location spatially overlaps with the block in the current picture, to be a reference block;

generating for at least one reference block a partitioning predictor for the current block based on partitioning information associated to the at least one reference picture; and partitioning the block in the current picture based on the partitioning predictor and the difference information.

* * * * *